Figure 1:
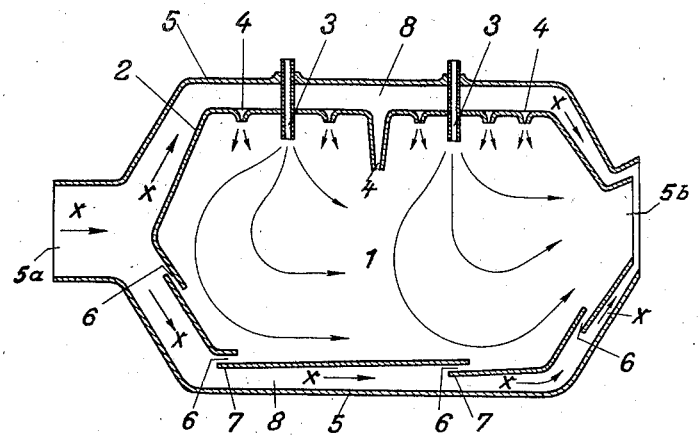

Patented Oct. 26, 1943

2,332,866

UNITED STATES PATENT OFFICE 2,332,866

COMBUSTION CHAMBER FOR GAS-FLOW ENGINES

Max Adolf Müller, Biederitz, Germany; vested in the Alien Property Custodian

Application November 17, 1938, Serial No. 240,907
In Germany November 18, 1937

2 Claims. (Cl. 60—44)

This invention relates to improvements in combustion chambers, and refers particularly to combustion chambers wherein fluid, liquid or powdered combustible material is to be mixed with air and burnt to form gases for use as a driving means or means of locomotion.

It has hitherto been necessary to make such combustion chambers of material which will withstand intense heat, and therefore natural stone or refractory material has most frequently been employed in their construction. Such materials however are quite heavy and so are not suitable for the combustion chambers of gas turbines or rocket motors for use on aeroplanes intended to travel at high altitudes and at great speeds, because in such cases every effort must be made to reduce the weight to a minimum. Such combustion chambers are intended for generating driving gases by burning gas-forming combustible material, either liquid or solid, under increased air pressure. Such chambers are subject to excessive temperature, pressure, and other factors not encountered by the ordinary furnace. The unit must be gas-tight, exceedingly light, and very rigid. Again when natural stone or refractory material is used for combustion chambers of gas turbines small pieces break off from time to time and are very liable to damage the turbine vanes.

It is an object of this invention to provide a combustion chamber having sheet metal walls, and to provide means permitting a constant flow of cool air adjacent their inner faces to protect them from the intense heat within the combustion space. Thus I aim to provide a combustion chamber wherein the high temperature of the products of combustion does not necessitate the use of high heat resisting material for the walls due to the fact that the constant flow of cool air forms a protecting layer between them and the high temperature gases; and wherein the walls are also made of a material which is not liable to break off and damage turbine vanes.

Another object of the invention is to provide such a combustion chamber consisting of light sheet metal walls around which a casing is spaced, so that cool air may flow freely between the casing and the walls to dissipate heat which may reach the latter through the protecting layer of cool air flowing adjacent the inner faces of the walls.

A further object of the invention is to provide a combustion chamber which is exceptionally light in weight, and is therefore very suitable for use on aeroplanes, and which can be very cheaply and simply constructed.

Another object of the invention is to provide a combustion chamber wherein a plurality of spaced wall portions confine a combustion space, and the wall portions are arranged within an outer casing through which a cool air inlet and an outlet for the products of combustion are provided, so that air from the inlet flows through channels formed between the casing and the wall portions to dissipate heat from the latter, and wherein between some of the wall portions slot-like passages are formed through which air from the inlet passes into the combustion space to form protecting layers of cool air to protect the inner faces of the said wall portions from the intense heat generated in the combustion space.

Yet another object of the invention is to provide a combustion chamber, in one form of which the products of combustion are directed or deflected by sheet metal wall portions extending into the combustion space; and wherein means are provided permitting a continuous flow of cool air into the said space to form a protecting layer of air to retain the burning gases spaced from the wall portions.

Figure 2:
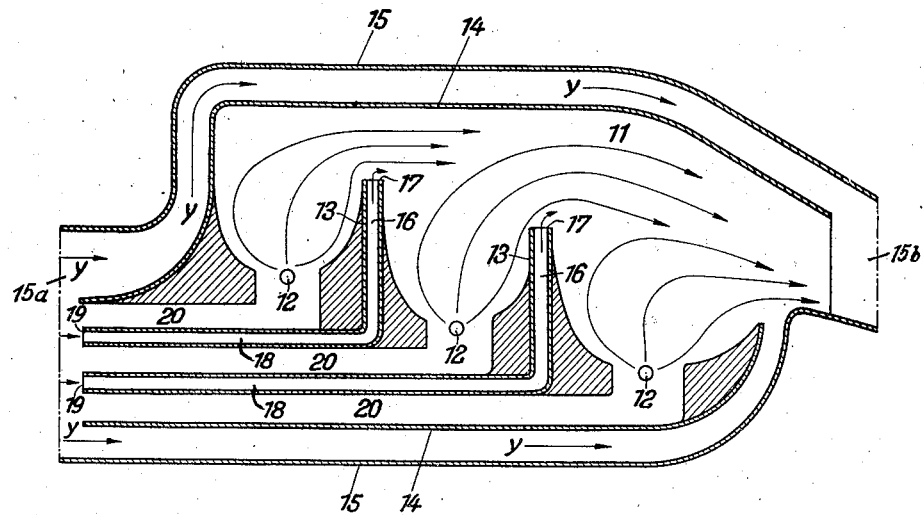

Having thus briefly stated some of the objects and advantages of the invention I will now proceed to describe it in detail with the aid of the accompanying drawing, in which:

Figure 1 illustrates a diagrammatic view showing a longitudinal section through one form of the combustion chamber, and Figure 2 is a diagrammatic view showing a longitudinal section through a modified form thereof.

Referring to the arrangement shown in Figure 1. The combustion space 1 is confined within a plurality of spaced wall portions 2 which are made of sheet metal, preferably sheet steel. Mounted around the wall portions 2 and spaced therefrom is an outer casing 5 having a cool air inlet 5a and an outlet 5b for the products of combustion and cooling air. Projecting through both the casing 5 and at least one of the wall portions 2 are a plurality of fuel inlets 3 through which liquid, fluid, or powdered combustible material is introduced into the combustion chamber 1. A plurality of air inlets 4 are also provided through at least one of the wall portions 2 for the passage of air for combustion purposes from one of the channels 8 defined between the casing 5 and the said wall portions 2. The air entering the inlet 5a flows in the direction of the arrows X. Some of this air is employed for combustion purposes as above stated, and the remainder either flows through the outlet 5b to dissipate heat from the wall portions 2 along the outer faces of which it flows during its passage through the said channels, or else it is employed in a manner hereinafter described for protecting the inner faces of the wall portions 2 from the burning gases within the combustion space 1. This cool air may be provided in any preferred manner; in the case of combustion chambers used on aeroplanes the casing inlet 5a may be so disposed that fresh air flows directly therein as the plane travels at high velocity.

On the side of the combustion space 1 opposite to that through which the fuel enters the wall portions 2 are spaced from one another so that slot-like passages 6 are formed between them. The trailing extremities 7 of the wall portions 2 between which the passages are formed extend outwardly in the adjacent channel 3 relative to the forward extremities of the adjacent wall portions, thus the passages 6 are disposed transversely of the channel 8 to permit direct and continuous flow of cool air from the inlet 5a into the combustion space 1. These trailing extremities 7 extend rearwardly of the adjacent wall portions to provide overlapping wall portions which constitute short ducts to control the direction of flow of the cool air and insure that it travels parallel with and adjacent the inner faces of these wall portions throughout their length. Thus constantly replenished protecting layers of cool air flow between these wall portions and the products of combustion in the combustion space thereby shielding the said wall portions from the intense heat.

Referring now to Figure 2, the combustion space 11 is confined within wall portions 14 around which an outer casing 15 is provided which has a cool air inlet 15a and an outlet 15b for the passage of the products of combustion and cooling air formed therethrough. Between the casing 15 and the said wall portions 14 cool air flows in the direction of the arrows Y. Fuel inlets 12 terminate within the combustion space 11 for the admission of combustible material and are separated from one another by other wall portions 13 arranged in spaced parallel pairs.

These wall portions 13 extend the entire width of the combustion space 11, project into the said space at their inner extremities, and are flexed intermediately of their length so that their outer extremities lie parallel to the direction of flow of cool air through the casing inlet 15a. Between the outer extremities of adjacent pairs of wall portions 13 orifices 19 are formed for the entry of cool air from the inlet 15a into passages 18. This air flows through extensions 16 of the passages 18 between the inner extremities of these pairs of wall portions 13 and is discharged through apertures 17 into the combustion space 11. This cool air constantly flowing keeps the wall portions 13 relatively cool as it absorbs heat from them during its travel through the passages 18 and 16, and after its discharge from the apertures 17 it retains the intense heat of the products of combustion spaced from these wall portions and particularly from their extremities adjacent the said apertures which would otherwise be quickly destroyed by heat, since it is of course understood that both these wall portions 13 and the wall portions 14 are again made of sheet metal.

Air inlets 20 are also formed from the inlet 15a parallel with the outer extremities of the wall portions 13, both between some of the latter and also between these wall portions and the wall portions 14 to permit air to flow into the space 11 for purposes of combustion.

While in the foregoing the preferred embodiments of the invention have been described and shown, it is understood that further alterations and modifications may be made thereto provided they fall within the scope of the appended claims.

What I claim is:

1. A combustion chamber for gas-flow engines comprising a sheet metal chamber having a fuel admission opening, an exhaust opening and a series of longitudinally spaced openings therein for the passage of streams of cooling fluid, said latter openings constituting slots formed by overlapping relatively large sections of the wall in spaced relation to one another to form wide passages lying in substantially absolute parallelism with the immediately adjacent wall section on the outlet side of the passage, the curvature of the wall of the chamber beyond each slot and the direction of each slot opening being such as to direct flow of the fluid toward the exhaust opening, an outer shell surrounding but spaced from said slotted chamber, and having, remote from said exhaust opening, an inlet for admitting the stream of cooling fluid into the space between said shell and chamber, the outer shell being shaped to direct portions of the cooling fluid stream successively into the series of spaced openings in the inner chamber and the remainder into the exhaust opening.

2. A combustion chamber for gas-flow engines comprising a pair of spaced, generally cylindrical, metallic shells forming an inner combustion chamber and a chamber between the two shells, an air inlet opening at one end of the outer shell, exhaust openings in the inner and outer shells at the opposite ends thereof, means for introducing fuel into the inner shell, and means for directing air from the inlet opening of the outer shell into the chamber surrounding said inner shell whereby a portion of such air reaches the exhaust openings and the remainder enters the inner shell, said inner shell comprising sections overlapped at their edges to form wide slots for directing air from between the shells into the inner shell in substantially absolute parallelism with the wall section on the outlet side of the slot, the wall sections forming the slots being arranged to successively reduce the cross-sectional area of the inner shell in the direction of the outlet opening.

MAX ADOLF MÜLLER.